United States Patent
Szilagyi

(10) Patent No.: US 8,393,652 B2
(45) Date of Patent: Mar. 12, 2013

(54) SHAPE-MEMORY ALLOY ACTUATOR AND LATCHES INCLUDING SAME

(75) Inventor: Andrei Szilagyi, Danville, CA (US)

(73) Assignee: Alfmeier Prazision Baugruppen und Systemlosungen, Treuchtlingen (DE)

( * ) Notice: Subject to any disclaimer, the term of this patent is extended or adjusted under 35 U.S.C. 154(b) by 882 days.

(21) Appl. No.: 11/719,110

(22) PCT Filed: Nov. 17, 2005

(86) PCT No.: PCT/US2005/041503
§ 371 (c)(1),
(2), (4) Date: Feb. 11, 2009

(87) PCT Pub. No.: WO2006/055618
PCT Pub. Date: May 26, 2006

(65) Prior Publication Data
US 2009/0174195 A1   Jul. 9, 2009

Related U.S. Application Data

(60) Provisional application No. 60/629,163, filed on Nov. 17, 2004.

(51) Int. Cl.
*E05C 3/06* (2006.01)
*E05C 1/06* (2006.01)

(52) U.S. Cl. .................... 292/201; 292/144

(58) Field of Classification Search ............ 292/144, 292/201
See application file for complete search history.

(56) References Cited

U.S. PATENT DOCUMENTS

| | | | |
|---|---|---|---|
| 3,634,803 A | 1/1972 | Willson et al. | |
| 4,551,975 A | 11/1985 | Yamamoto et al. | |
| 4,806,815 A | 2/1989 | Honma | |
| 5,358,292 A | 10/1994 | Van Wiebe et al. | |
| 5,977,858 A | 11/1999 | Morgen et al. | |
| 6,008,992 A | 12/1999 | Kawakami | |
| 6,310,411 B1 * | 10/2001 | Viallet | 307/125 |
| 6,871,519 B2 * | 3/2005 | Butera et al. | 70/256 |
| 7,617,703 B2 * | 11/2009 | Osvatic | 68/12.26 |
| 2003/0177974 A1* | 9/2003 | Dominique | 116/200 |
| 2004/0107458 A1 | 6/2004 | Spiessl et al. | |
| 2005/0046200 A1 | 3/2005 | Dominique | |
| 2005/0146147 A1 | 7/2005 | Niskanen et al. | |
| 2005/0184533 A1 | 8/2005 | Hebenstreit et al. | |
| 2005/0212304 A1* | 9/2005 | Herrera et al. | 292/251.5 |
| 2006/0012191 A1 | 1/2006 | Brei et al. | |

FOREIGN PATENT DOCUMENTS

JP       02038679 A   *   2/1990

OTHER PUBLICATIONS

International Search Report from PCT/US2005/041503 published May 26, 2006—3 pages.

* cited by examiner

*Primary Examiner* — Carlos Lugo
(74) *Attorney, Agent, or Firm* — Dority & Manning, P.A.

(57) ABSTRACT

An SMA actuator includes an SMA element having a first end, a second end, and a central portion therebetween, the SMA element being oriented so that the first and second ends are adjacent one another and attached to one of an anchor interface or payload interface, and so that the central portion of the SMA element is attached to the other of the anchor interface or the payload interface. An electrical shorting device electrically connects the first and second ends, whereby electrical potential may be provided between a first point located between the first end and the central portion and a second point located between the second end and the central portion, thereby causing the SMA element to activate reducing the length of the SMA element. Related latches are disclosed including such actuator, or other simplified or more complex actuators.

17 Claims, 10 Drawing Sheets

SHAPE-MEMORY ALLOY ACTUATOR AND LATCHES INCLUDING SAME

RELATED APPLICATIONS

This application claims benefit of International Patent Application, Serial Number PCT/US2005/041503, titled "Shape-Memory Alloy Actuator and Latches Including Same", filed Nov. 17, 2005, which claims priority to U.S. Provisional Patent Application No. 60/629,163, filed on Nov. 17, 2004, titled "High Speed Shape-Memory Alloy Actuator for Trunk and Fuel Tank Latches", both of which are hereby incorporated by reference in their entirety.

FIELD OF INVENTION

The present invention relates generally to actuators incorporating elongated shape memory alloys (SMA). More particularly it relates to designs for and use of such actuators in the field of automotive latches, such as trunk latches and fuel filler flap latches.

BACKGROUND OF INVENTION

Shape memory actuators produce displacement or force by forcing a suitable actuator element to undergo a transition between a low and a high temperature phase (martensite and austenite, respectively), each phase having characteristic dimensions. The necessary energy is most commonly supplied by ohmic heating and removed by any convenient mechanism, such as conductive, convective or radiative heat transfer. The use of SMA-based actuators is steadily growing owing in large part to their propensity for being conveniently packaged into narrow form factors. This ability is related to the fact that shape memory alloys are shaped into wires of modest cross section and sufficiently long length to achieve useful stroke during their activation. The slender shape is what permits insertion of SMA wires into narrow spaces.

As shown in FIG. 1, the simplest arrangement of an SMA actuator as a straight length of wire 10, however, remains somewhat awkward since the application of ohmic heating would require making electrical contacts to wire ends 12, 14 located at some distance from each other. End 12 is illustrated at anchor interface 16 and end 14 is illustrated at payload interface 18. Voltage potential is provided by wire 20 and ground is connected by wire 22.

Accordingly, folded geometries have been employed so as to allow both electrical contacts to be near one another. As shown in FIG. 2, SMA actuator wire 10' is folded so that ends 12, 14 are near one another. An example of this folded geometry is given in FIG. 5 of U.S. Pat. No. 3,634,803. Another reason to prefer this geometry is that for a single fold, the two sides of the wire on each side of the fold account for a doubling of the available force compared to a single strand of the same cross section. Unfortunately, this benefit is accomplished by a doubling of the electrical resistance. When powered from a voltage source, the doubling results in halving the electrical current and the Joule heating power, while the heating time is significantly increased. If slower activation is not acceptable, the designer has the option of restoring the resistance of its initial value. One way to do this is by shortening the actuator by a factor of two. This time, the drawback is a reduction in stroke by the same factor.

As illustrated in FIG. 3, the other approach is to double the cross sectional area of the SMA wire 10" by increasing the wire diameter by about 41%. This allows the designer to keep both the increased force and the previous stroke, while the activation time is actually improved, even with respect to the case depicted in FIG. 1. Unfortunately, this option also has disadvantages. The first is that—once again—the electrical contacts are inconveniently located at opposite ends 12, 14 of a long actuator. The second is that now the cooling time is significantly increased, by an amount even greater than the shortening of the contraction time.

What is needed is an actuator which can incorporate the force benefit of FIG. 2 and FIG. 3, the convenient electrical interface shown in FIG. 2, and the activation speed of the configuration shown in FIG. 3, while retaining the cooling speed of that shown in FIG. 2.

SUMMARY

According to certain aspects of the present invention, an SMA actuator is disclosed. Another aspect of the present invention teaches an improved latch release mechanism including an SMA actuator. The latch release mechanism may be applied to various applications including trunk and fuel tank latches, with or without SMA actuators as well.

According to certain aspects of the invention, an SMA actuator includes an SMA element having a first end, a second end, and a central portion therebetween, the SMA element being oriented so that the first and second ends are adjacent one another and attached to one of an anchor interface or payload interface, and so that the central portion of the SMA element is attached to the other of the anchor interface or the payload interface. An electrical shorting device electrically connects the first and second ends, whereby electrical potential may be provided between a first point located between the first end and the central portion and a second point located between the second end and the central portion, thereby causing the SMA element to activate reducing the length of the SMA element. Various options and modifications are possible.

For example, the payload interface may be a portion of one of a trunk latch or a fuel tank latch. The electrical potential may be connected via wires each having a terminal attached thereto, the terminal being attachable to the SMA element. The first point and second point may be each generally halfway between the payload interface and the anchor interface.

The payload interface may be a portion of a latch. The latch may be configured to that activation of the SMA element moves the portion of the latch so that the latch is openable by a user, and the latch may be configured so that upon reclosing of the latch the SMA element is not damaged by movement of the portion of the latch.

According to other aspects of the invention, an SMA actuator latch includes a movable catch attached to a closeable element; a keeper movable between positions engaged with the catch or separated from the catch; a pawl movable between a first position holding the keeper in the engaged position or a second position allowing the keeper to move; and an SMA actuator for moving the pawl from the first position to the second position. Again various options and modifications are possible.

For example, the SMA actuator may be connected to the pawl. Also, the latch may further include a hook member for selectively retaining the pawl in the first position, the SMA actuator being connected to the hook member. The latch may be one of a trunk latch or a fuel tank latch; the catch may be one of a rotatable member or a leaf spring; the pawl may be spring biased; and/or the catch may be spring biased.

The keeper may reset the catch upon re-closing of the latch. Also, the SMA actuator may include an SMA element having a first end, a second end, and a central portion therebetween, the SMA element being oriented so that the first and second ends are adjacent one another and attached to one of an anchor interface or a portion of the latch, and so that the central portion of the SMA element is attached to the other of the anchor interface or the portion of the latch; and an electrical shorting device electrically connecting the first and second ends, whereby electrical potential may be provided between a first point located between the first end and the central portion and a second point located between the second end and the central portion, thereby causing the SMA element to activate reducing the length of the SMA element and moving the portion of the latch, to thereby move the pawl from the first position to the second position. If so, the electrical potential may be connected via wires each having a terminal attached thereto, the terminal being attachable to the SMA element. Also, the first point and second point may be generally halfway between the payload interface and the portion of the latch.

DETAILED DESCRIPTION

Figure 1:
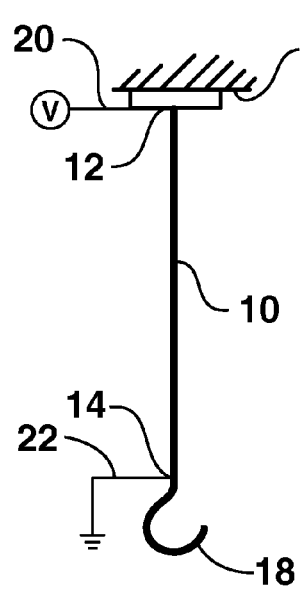
FIG. 1 is a diagrammatical representation of prior art SMA actuator arrangement having a basic geometry.

Detailed reference will now be made to the drawings in which examples embodying the present invention are shown.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and not meant as a limitation of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

Figure 2:
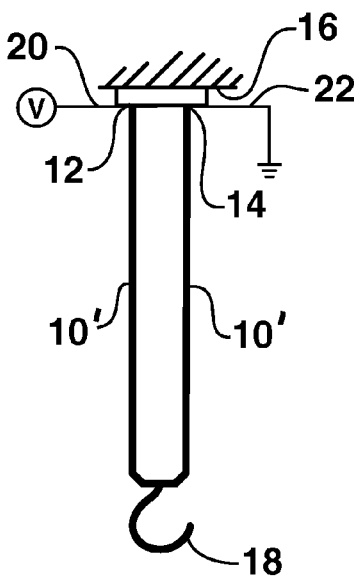
FIG. 2 is a diagrammatical representation of alternate prior art SMA actuator arrangement having a folded geometry.
Figure 3:
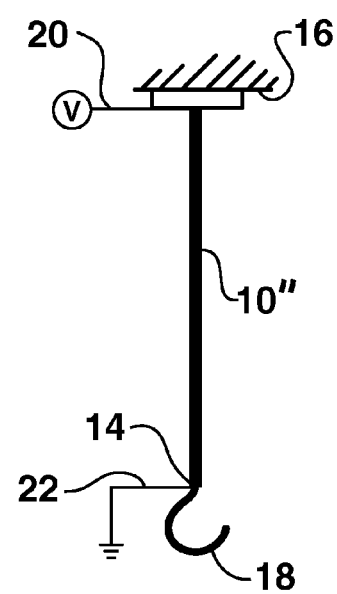
FIG. 3 is a diagrammatical representation of another alternate prior art SMA actuator arrangement having a thickened geometry.
Figure 4:
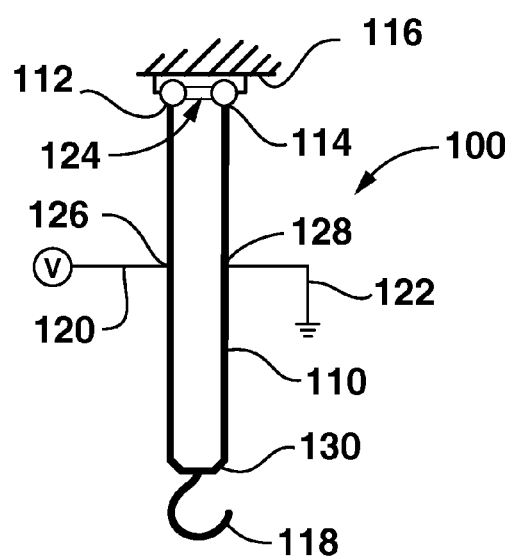
FIG. 4 is a diagrammatical representation of an example of an SMA actuator according to certain aspects of the present invention including mid-wire electrical contacts.

According to certain aspects of the present invention, an SMA actuator 100 is illustrated in FIG. 4. SMA actuator 100 can have relatively the same amount of SMA wire 110 as the prior art structure of FIG. 2, and structurally differs at least by its electrical interconnect. In the preferred embodiment, two SMA wire ends 112, 114 that had previously been electrically isolated from one another are now to be electrically joined by an electrical shorting device 124. Such device 124 is illustrated only diagrammatically, and may take various forms already known in the art, including:
  (i) winding the wire ends 112, 114 on a common binding post to be secured by tightening a nut;
  (ii) crimping separate terminals on each wire end 112, 114 later to be joined by soldering a short conducting wire between them; or
  (iii) using a single crimping component fitted with two crimping areas, one for each of the two wire ends 112, 114.

Accordingly, electrical shorting device 124 may take any of the above forms or others suitable for electrically connecting ends 112, 114. Another example of an electrical shorting device 124 will be disclosed below in relation with other aspects of this invention.

It should be noted that the electrical shorting device 124 may be the same as (i.e., comprise a part of) the fixed mechanical anchor interface 116 securing the SMA wire 110 to a relatively immovable object such as an actuator housing or a nearby structure. In this case, the anchor interface 116 should be selected to be electrically conductive, so as to provide the electrical shorting path discussed above.

Also, as shown in FIG. 4, electrical contacts 120, 122 for an exemplary device of a specific embodiment can be made near the middle of or at least spaced from the ends of, each SMA wire leg. Thus, voltage potential may be connected at point 126 and ground may be connected at point 128, both points being spaced from anchor interface 116 and payload interface 118 located at central portion of wire 100. As illustrated, such connections are generally centrally located between electrical shorting device 124 and bend 130, thereby providing two somewhat equal paths between points 126 and 128. However, it should be understood that numerous variations in the geometry diagrammatically illustrated in FIG. 4 are possible.

Figure 5:
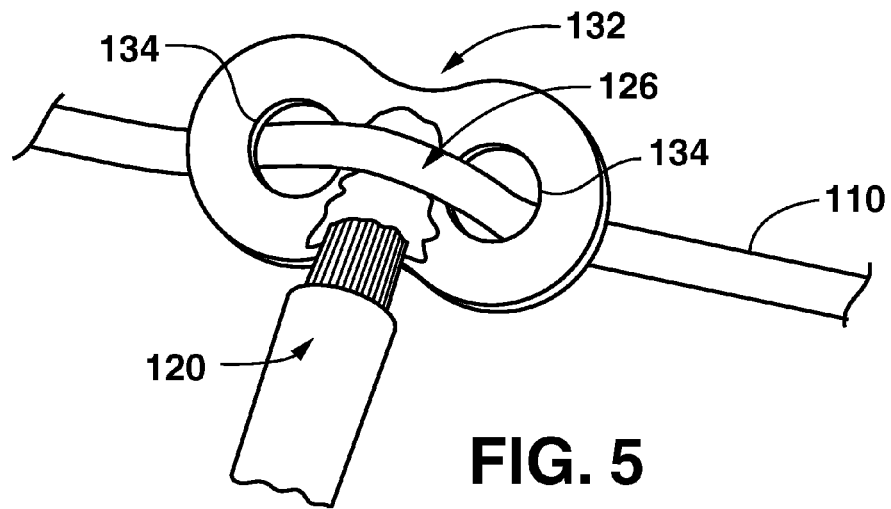
FIG. 5 is a perspective view of one example of a mid-wire connector for an SMA wire having two holes.

FIG. 5 illustrates how such contacts may be made according to a particular embodiment of the present invention. According to this embodiment, a sliding terminal 132 consisting of a conductive material (alloys such as berylliumcopper, nickel-silver, phosphor-bronze, etc.) is provided with two holes 134, made for example by stamping or chemical etching, and adapted to threadingly receive the SMA wire 110. The normal tension in the wire 110 tends to keep the wire straight, but threading it from one side of the terminal 132 to the other and then back again tends to bend the wire. The contradiction is resolved by compromise: the wire 110 acquires a small, local deflection, and the previously flat terminal 132 is also bent somewhat to an extent which minimizes the overall deformation energy. Since deformation energy cannot be eliminated, both the wire 110 and the terminal 132 acquire a residual stress which maintains them in firm contact regardless of SMA activation. When the terminal 132 has a flexible wire (electrical contact 120, for example) soldered to it as illustrated in FIG. 5 or crimped to it (see FIG. 6 or 7), the electrical contact can be maintained reliably without the terminal 132 sliding along the wire 110, although its ability to slide may be used during assembly to position the contact in the most propitious location. The electrical contact is also enhanced by the proximity of the relatively sharp edges of the terminal holes 132 to the wire 110, and is able to withstand significant variations in wire tension without loosening.

Figure 6:
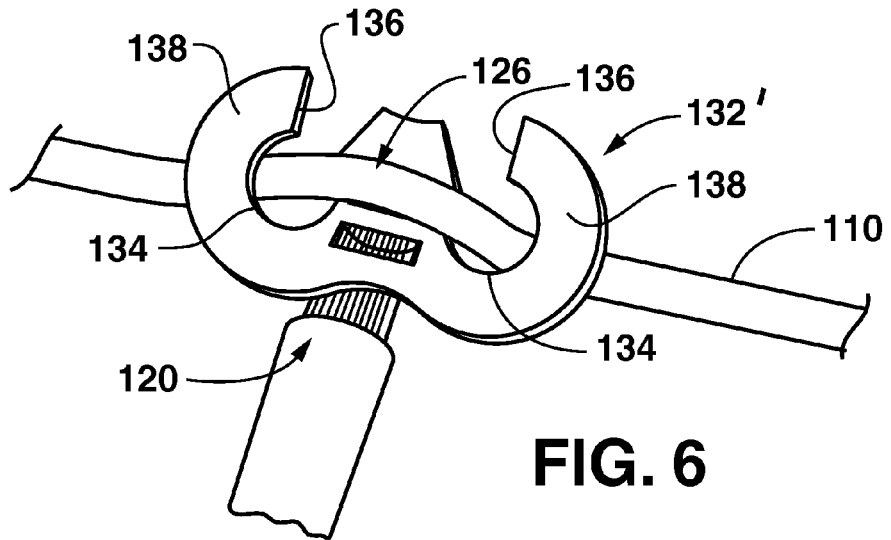
FIG. 6 is a perspective view of an alternate example of a mid-wire connector for an SMA wire having notched holes.
Figure 7:
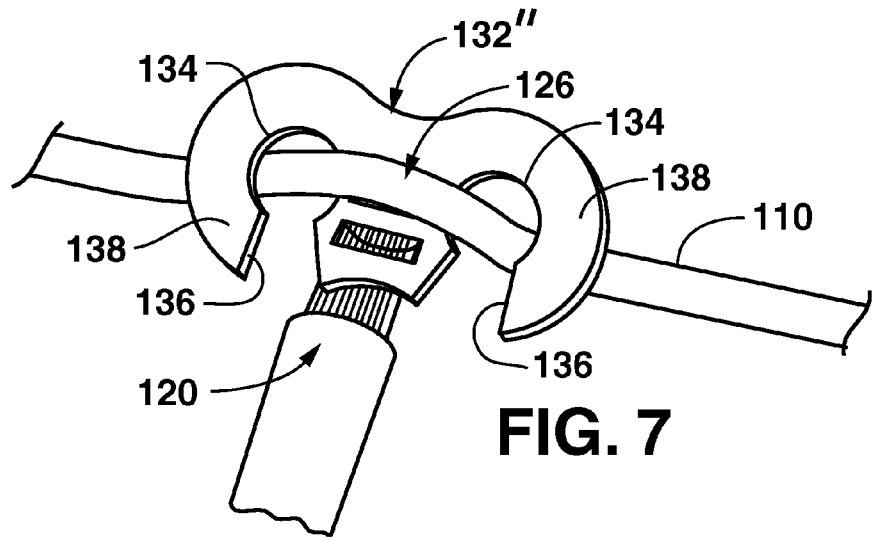
FIG. 7 is a perspective view of another alternate example of a mid-wire connector for an SMA wire having notched holes.

Similar properties are enjoyed by terminal variants 132', 132" illustrated in FIGS. 6 and 7. These variants differ from the previous terminal example 132 by having lateral notches 136 opened into the walls 138 of holes 134. These notches 136 permit assembly of the mid-length terminals onto the SMA wire 110 after the latter is already assembled into the actuator. Terminal versions 132' and 132" differ from each other in the orientation of these notches 136. Placing the notches 136 proximally to the electrical wire pigtail 120 as in FIG. 7 may result in slightly greater contact stability if the pigtail is expected to be under some mechanical tension (at right angles to the SMA wire 110).

Applications of one or more of the concepts above are illustrated in FIGS. 8-19. The fast acting SMA actuator concepts discussed above are shown in the exemplary context of automotive latches, such as one used for trunks (FIGS. 8-13) and for fuel filler flaps (FIGS. 14-19). SMA actuators may be suitable for this family of latches due to various possible requirements on their actuator, namely relatively high force, high stroke, high speed, broad range of operating temperature, low weight, and slender package form factor.

Although illustrations discussed below teach the combined use of a fast acting SMA actuator and certain latches, the resourceful practitioner of the art will recognize that the various inventive components may be separated under conditions where one or more of the performance requirements is relaxed. For instance, if the range of operating temperatures is reduced, it may be possible to operate either trunk latches or fuel flaps by simply substituting a fast acting SMA actuator for the conventional geared electric motor presently employed in the industry in these applications. Conversely, if rapid actuation and package weight are not essential, the latches described below might be operated with any convenient small motor. In the figures below, the SMA actuators are depicted in a very schematic way to reflect the choices available to the designer to choose a fast acting SMA actuator or any other convenient actuator based on the stringency of the specific requirement.

Compared to prior art trunk and fuel filler flap latches, the latches of the instant invention allow their actuators to operate, for example, with reduced force and stroke output. This is accomplished by collecting a moderate amount of energy from the human user who already expects to fully open the trunk latch or tank flap by hand.

The construction and operation of one suitable trunk latch mechanism 200 is best seen in FIGS. 8-13. The latch 202 of mechanism 200 resembles in many ways a conventional trunk latch where the latch is typically mounted near the moving edge of the trunk lid and a mating metal loop (or keeper) 204 is fastened near the rear edge of the trunk floor, although these locations could be reversed. When the trunk is locked, the catch 206 captures and holds the loop 204 securely. A conventional pawl 208 is spring biased so as to engage the catch 206. As illustrated, springs 210 and 212 bias catch 206 and pawl 208 respectively. Thus, if a conventional actuator (a geared electric motor) were used, it would need to overcome not only the friction between the loaded catch 206 and the pawl 208 but also the resistance of the spring 212 of the pawl.

Figure 8:
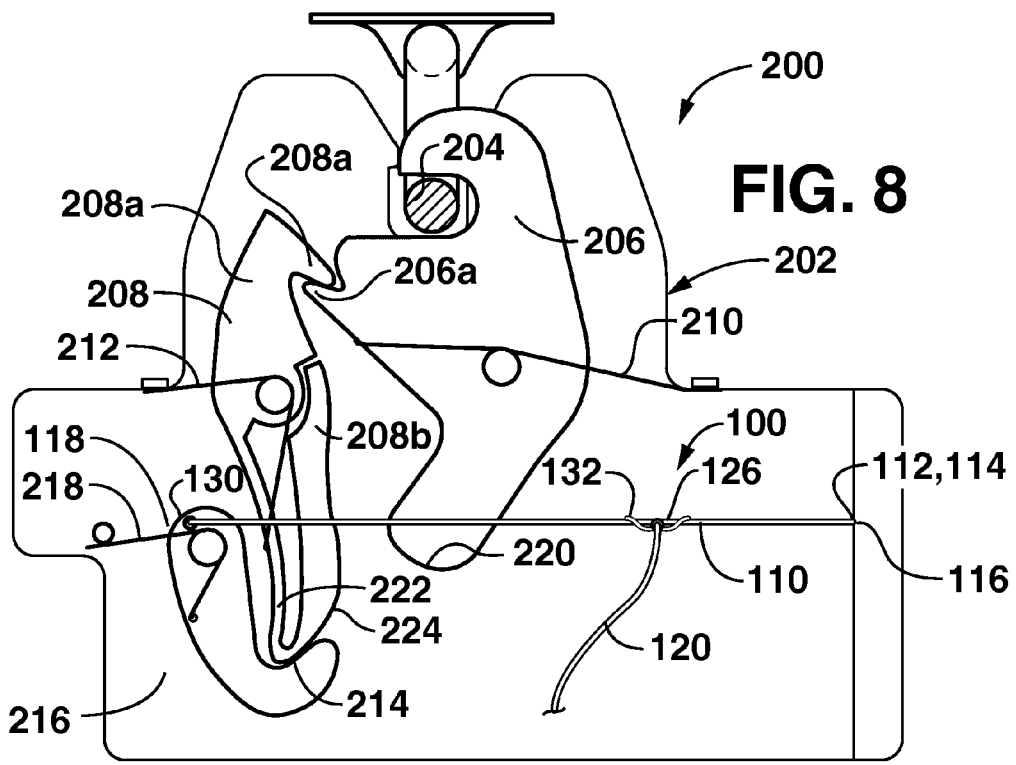
FIG. 8 is a side diagrammatical view of one example of a trunk latch according to certain aspects of the invention, in a closed position.

In FIG. 8 it is seen that the pawl 208 of the present invention is spring biased, but it is biased in a direction urging the pawl away from the engagement with the catch 206. To prevent this from happening unintentionally, the bottom end 214 of the pawl 208 is restrained by a hook-like device 216, biased by a spring 218 in a direction which favors engagement of the pawl bottom end. The hook can overcome this bias when the SMA actuator 100 is activated. Another difference from the prior art is the presence of a cam lobe 220 on the catch 206. This lobe 220 allows the rotation of the catch 206 to be transmitted to the pawl 208 in a direction opposite to the spring bias of the pawl. A further difference in the construction of the pawl 208 is the presence of an elastically compliant section 222 between top portion 208a and bottom portion 208b. This permits the top and bottom portions of the pawl 208 to undergo a small amount of relative rotation under certain conditions such as re-closing that may be understood by following the operation of the device in FIGS. 8-13.

Figure 9:
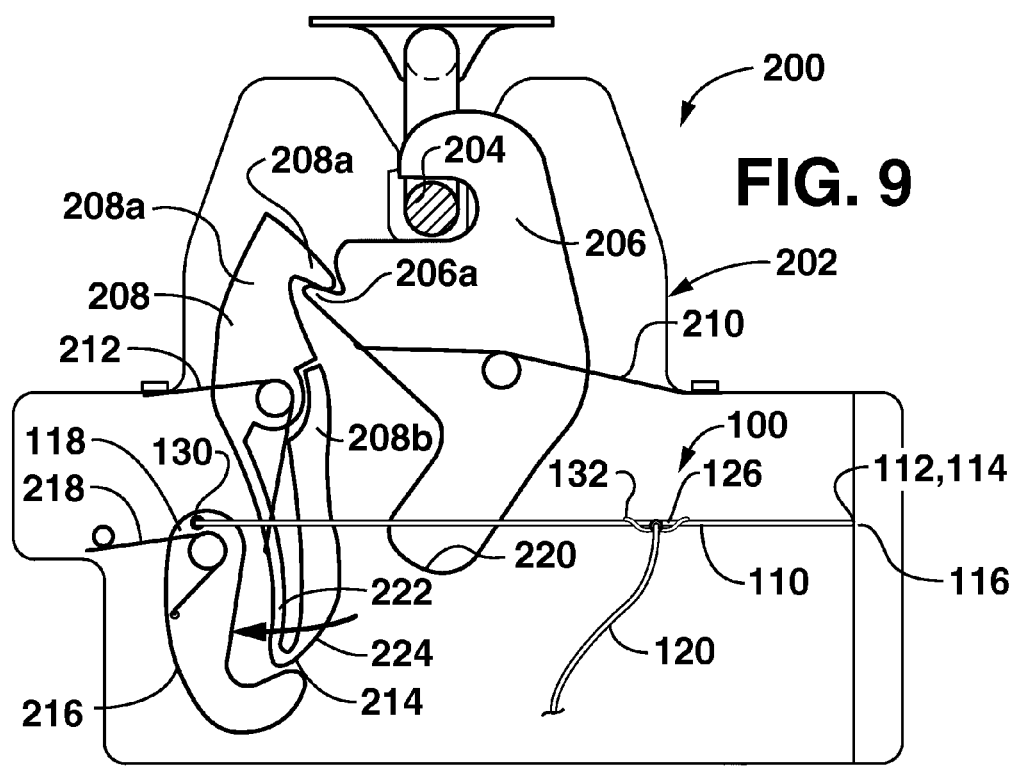
FIG. 9 is a side diagrammatical view of the trunk latch of FIG. 8, as opening begins.
Figure 10:
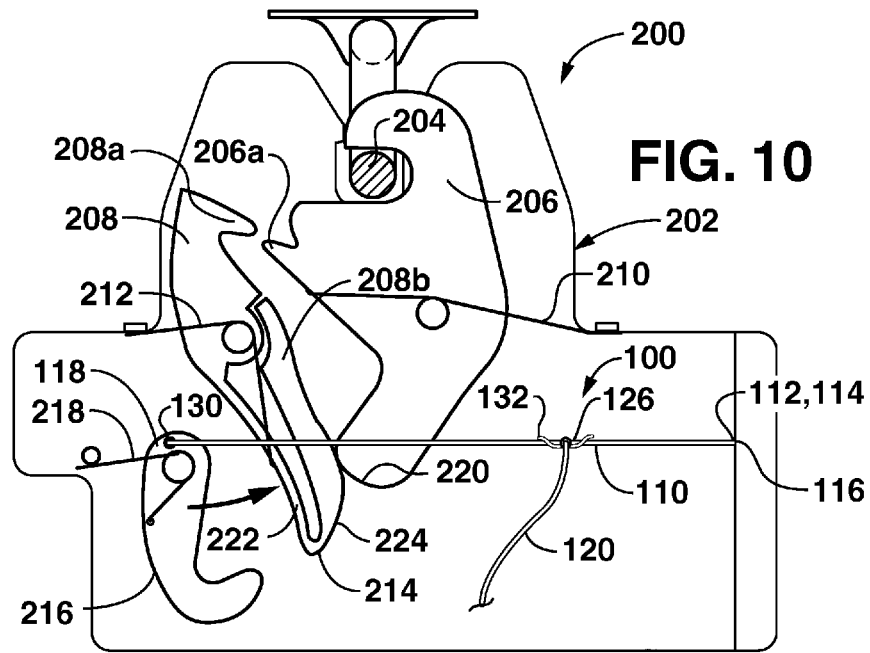
FIG. 10 is a side diagrammatical view of the trunk latch of FIG. 8, as opening continues.
Figure 11:
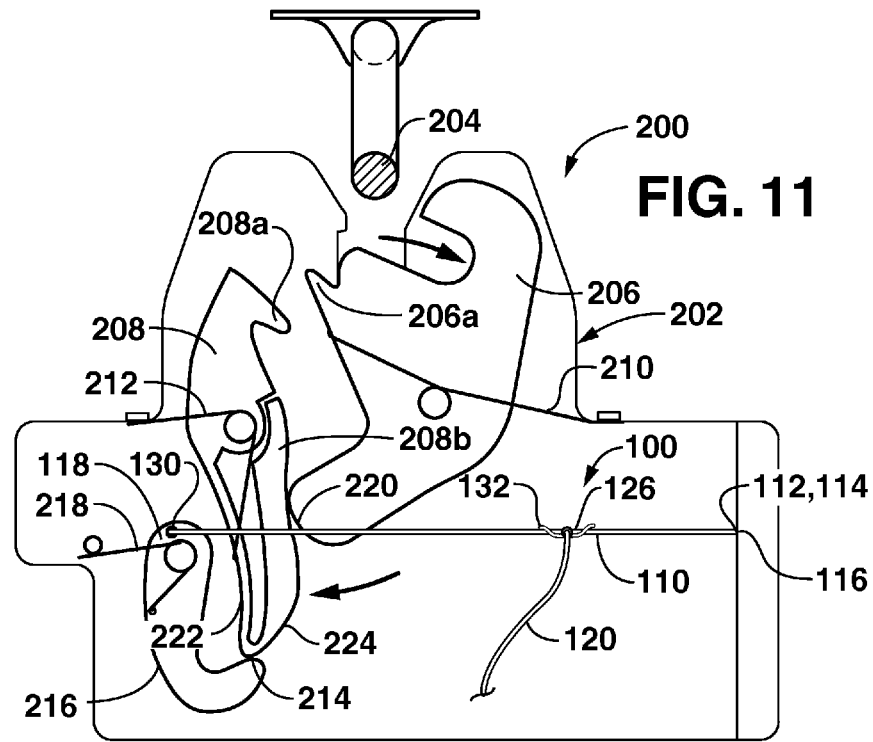
FIG. 11 is a side diagrammatical view of the trunk latch of FIG. 8, as opening continues further.

The operation of the latch mechanism 200 may be understood by the positions shown in FIGS. 8-13. In FIG. 8, the latch mechanism 200 is closed and the trunk lid is locked. In FIG. 9, the SMA actuator 100 has been activated. In FIG. 10, the SMA actuator 100 has been further actuated. Accordingly, the hook 216 is moved until it releases bottom end 214 of the pawl 208, the pawl then releases the catch 206, and the catch pivots clockwise until cam lobe 220 contacts the pawl. In FIG. 11, further rotation of catch 206, whether by spring force or an operator pulling on the trunk, frees loop 204, opening the trunk. Cam lobe 220 causes pawl 208 to continue clockwise rotation, eventually returning the pawl bottom 214 to its original position re-engaging the hook 216. Therefore, when the catch 206 is fully open, both the pawl 208 and the hook 216 have returned to their original position as in FIG. 8. This action can follow SMA activation relatively quickly. This means that when the hook 216 attempts to return to its initial position, the SMA actuator 100 may not have cooled sufficiently to allow the hook to return right away. Fortunately, while the SMA actuator 100 is cooling, the job of restraining the pawl 208 can be accomplished by the cam lobe 220 of the catch 206. The combination of the spring tension biasing the catch 206 toward the open position and the design of the lobe 220 and its mating surface 224 allows the spring bias of the pawl 208 to overcome the friction of the loaded catch 206 during unlatching, and yet cannot overcome the bias of the catch 206 when the cam surfaces 220, 224 are in contact. If necessary, the SMA actuator 100 may have an overstress protection mechanism (not shown) installed near the built-in extremity of the actuator. Such mechanism may consist of a mechanically compliant interface which is normally immovable, but may deflect when tensile stress exceeds a predetermined value, thus protecting the longevity of the actuator.

Figure 12:
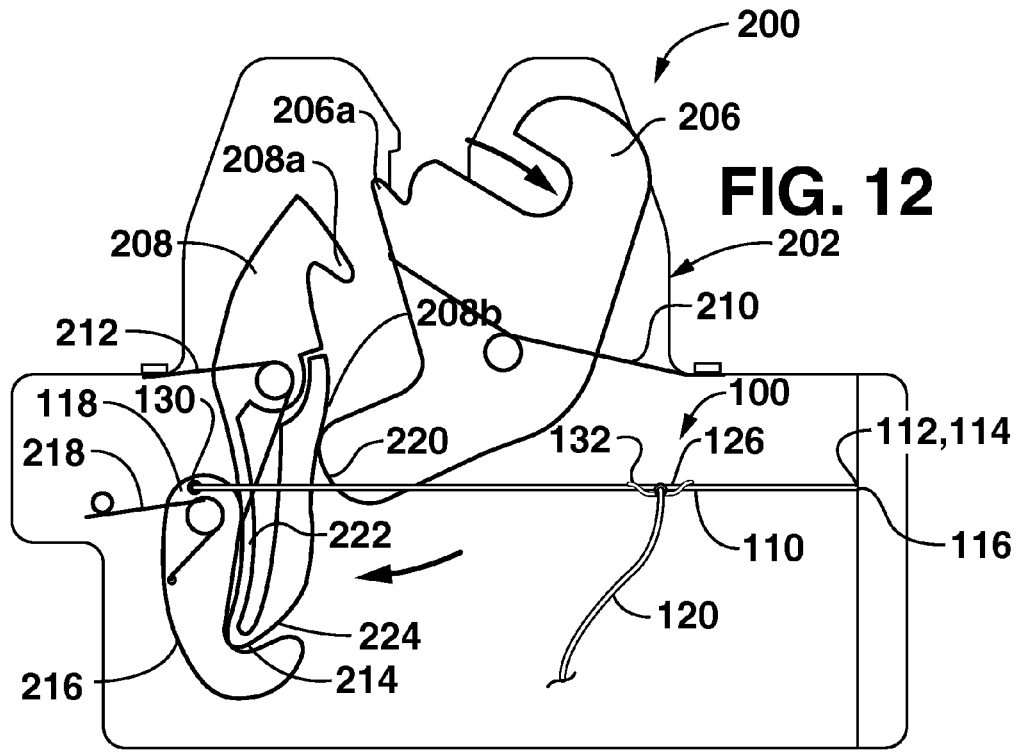
FIG. 12 is a side diagrammatical view of the trunk latch of FIG. 8, in an opened position, ready for re-closing.
Figure 13:
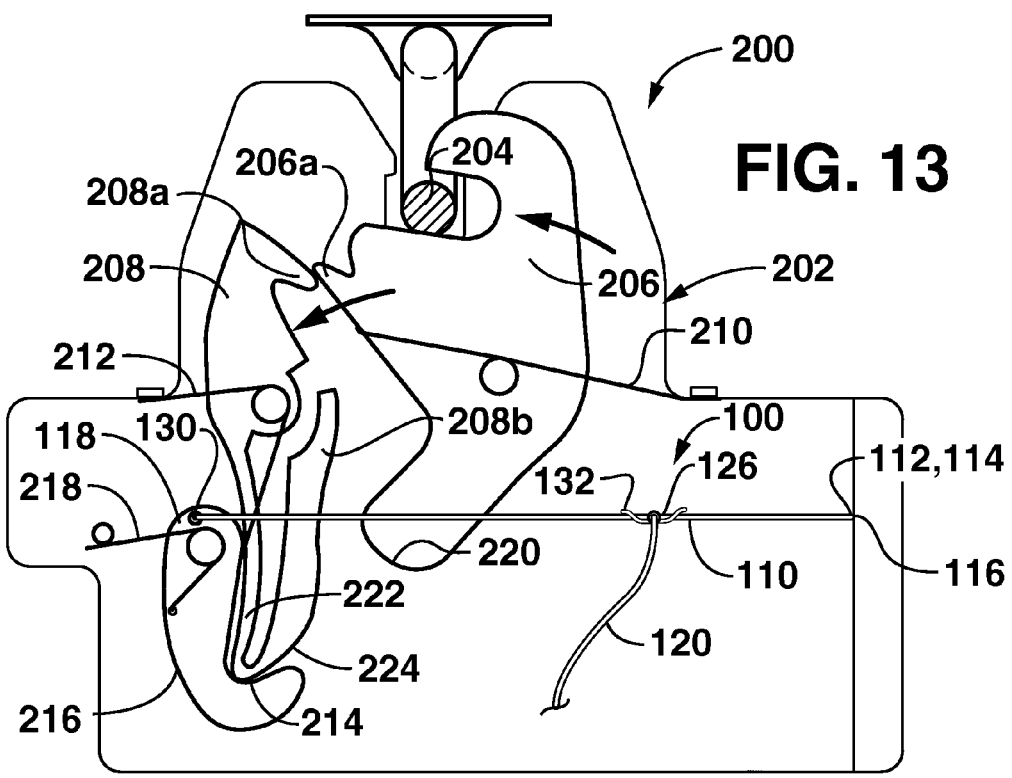
FIG. 13 is a side diagrammatical view of the trunk latch of FIG. 8, as closing continues.

With regard to the re-latching action depicted in FIGS. 12 and 13, it is seen that the presence of the hook 216 shields the SMA actuator 100 from any variation in stress during the closing of the trunk. As shown, during closing, the catch 206 rotates counterclockwise until it contacts upper portion 208a of pawl 208 with tip 206a. Upper pawl 208a rotates counterclockwise but, due to presence of compliant section 222, bottom end 214 of pawl 208 remains retained by hook 216.

Eventually, tip 206a of catch 206 passes upper pawl portion 208a and is retained therein. The upper pawl 208a then snaps back into position, returning the device to the locked position of FIG. 8.

Although the pawl 208 is described as being of unitary construction with two mobile portions 208a and 208b connected by a compliant section 222, the same functionality may be alternatively accomplished by a more conventional construction consisting of two rigid links with a common pivot point and with an additional spring bias adapted to urge the two portions to be positioned opposite from each other.

Therefore, using mechanism 200, one may activate a trunk lid latch mechanism using minimal actuator stroke and force, but using the manual reset action available when the user opens the lid after remote unlocking. The catch 206 may be moved to an openable position due to SMA actuator activation of the hook 216 and pawl 208. Therefore, the user can lift the lid to cause additional rotation of catch 206. Alternately the catch 206 may be spring driven to open fully upon SMA actuator moving the hook 216 and pawl 208. If it is desired to open the catch 206 fully without user intervention, an overstress protection compliant element may be added at anchor 116 for the SMA actuator 100. This way, the early closing of the hook 206 would not damage the SMA actuator 100.

Figure 14:
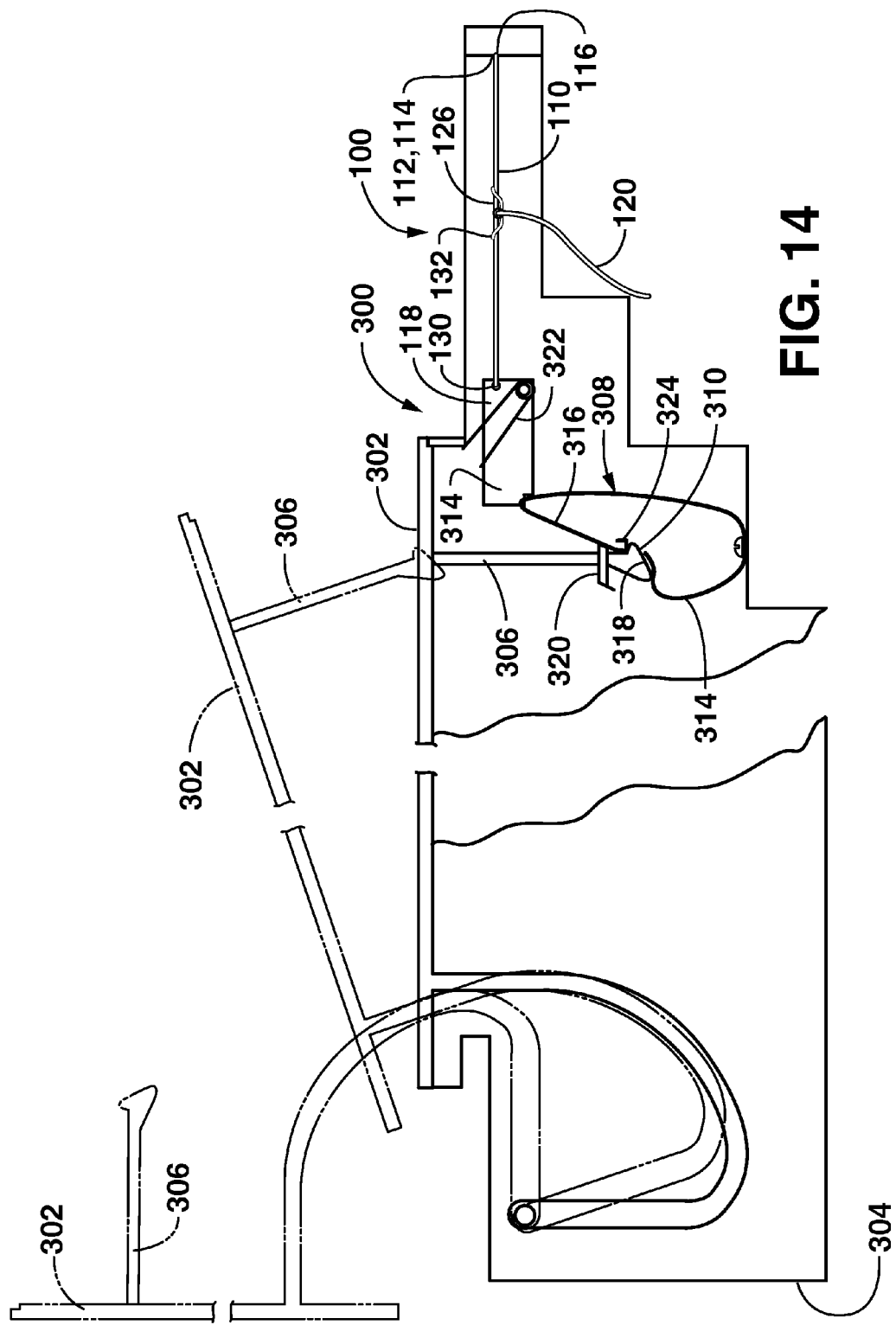
FIG. 14 is a side diagrammatical view of one example of a fuel tank latch according to certain aspects of the invention, showing an opened and closed position.
Figure 15:
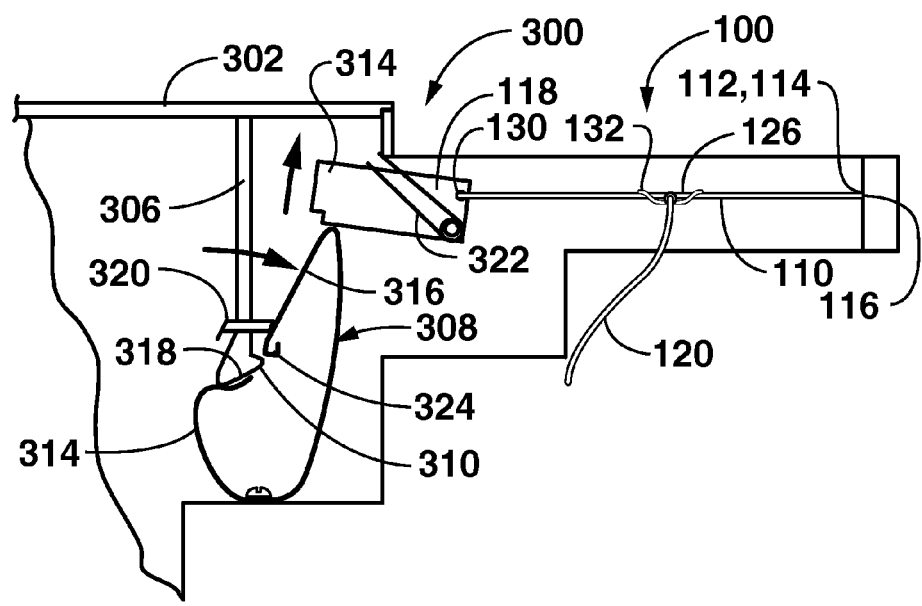
FIG. 15 is a side diagrammatical view of a portion of the fuel tank latch of FIG. 12, as opening begins.
Figure 16:
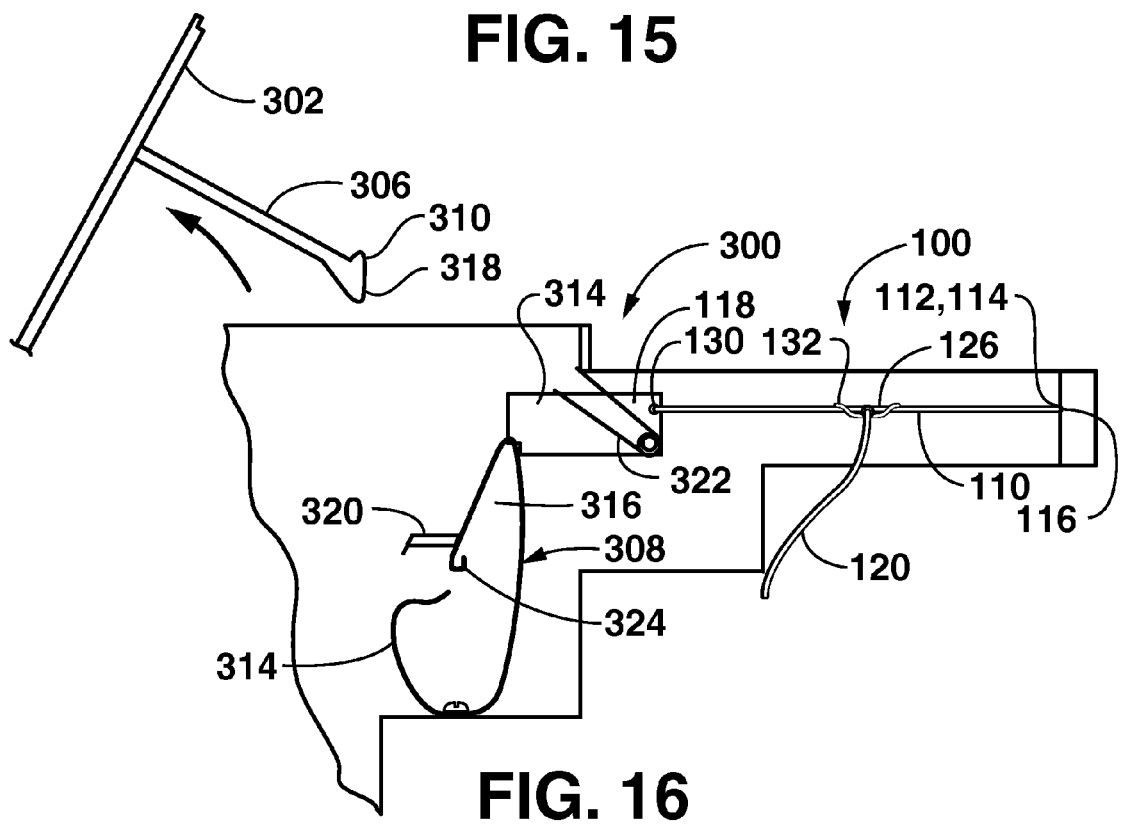
FIG. 16 is a side diagrammatical view of a portion of the fuel tank latch of FIG. 12, as opening continues.
Figure 17:
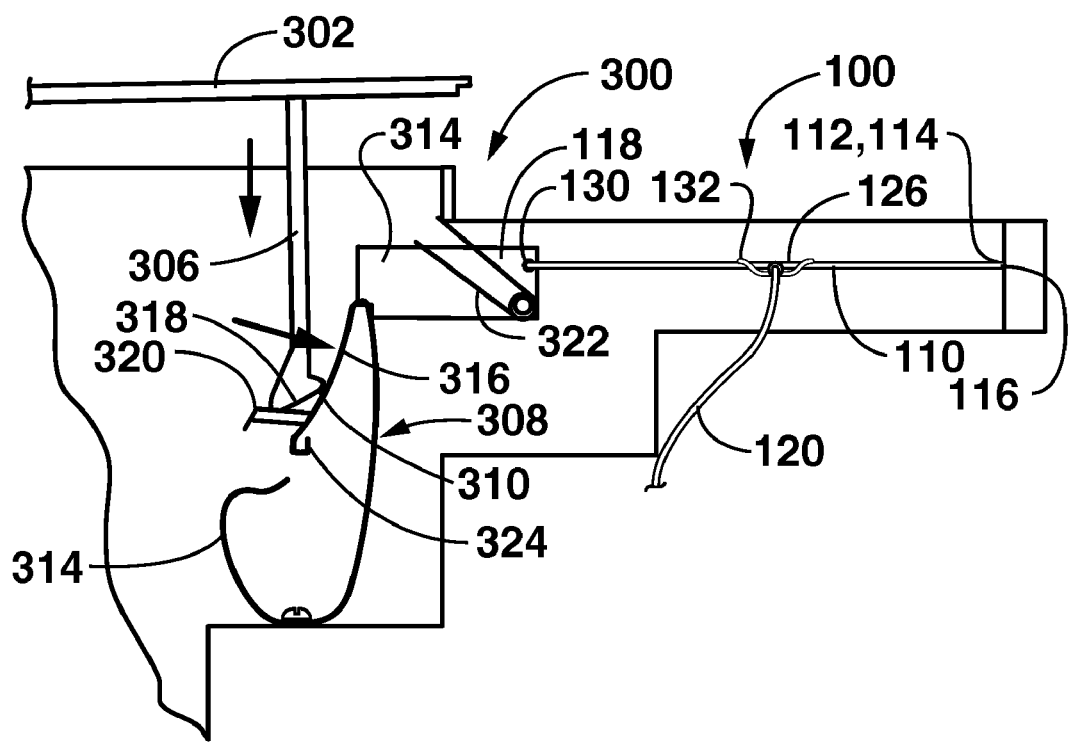
FIG. 17 is a side diagrammatical view of a portion of the fuel tank latch of FIG. 12, as reclosing begins.
Figure 18:
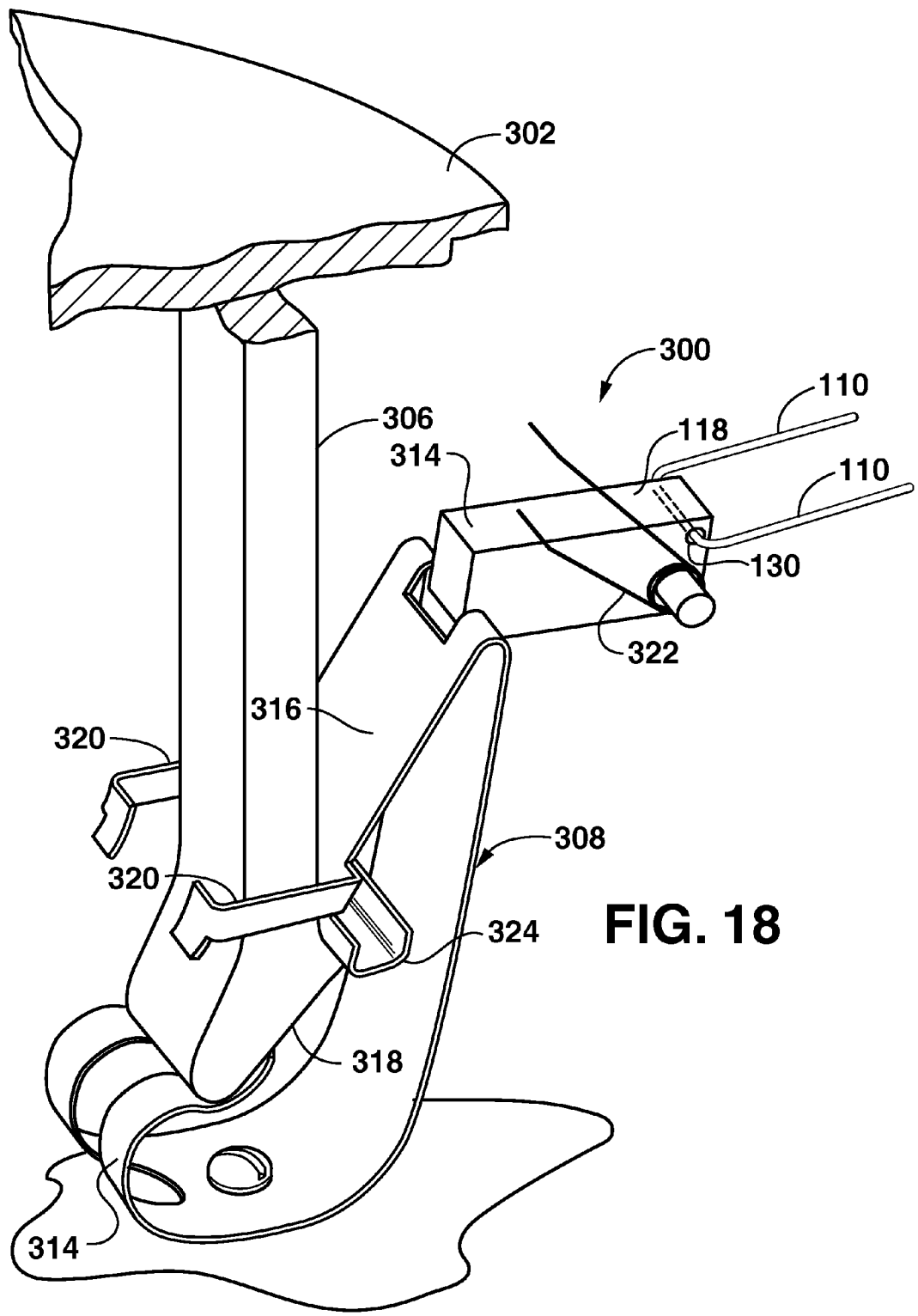
FIG. 18 is a perspective view of a portion of the fuel tank latch of FIG. 12, in a closed position.
Figure 19:
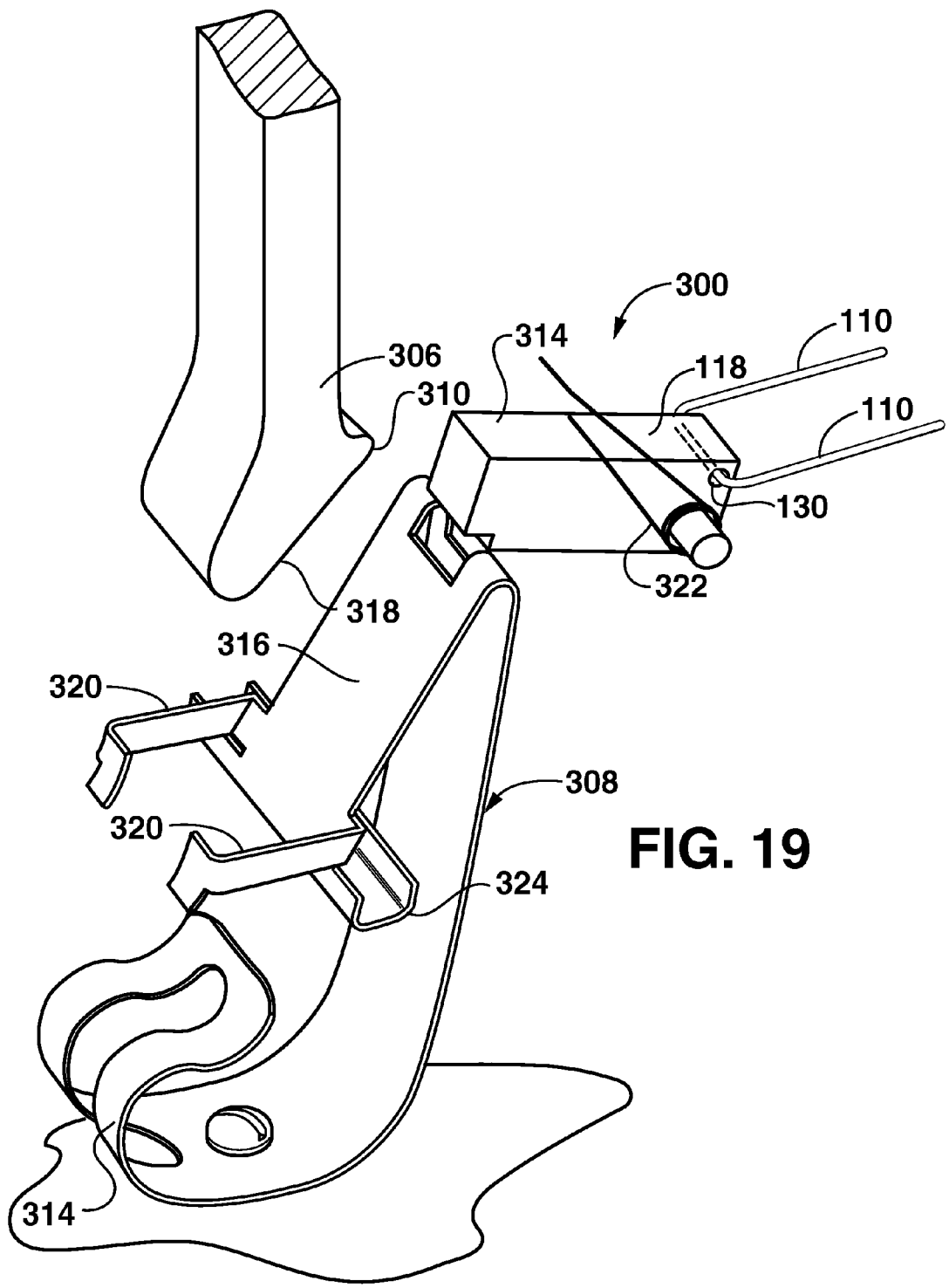
FIG. 19 is a perspective view of a portion of the fuel tank latch of FIG. 12, in an opened position.

The construction and operation of the fuel filler flap latch, also known as the tank latch is shown in FIGS. 14-19. FIG. 14 shows a fuel flap latch mechanism 300 along with a fuel flap 302 pivotally mounted to a vehicle body 304. Flap 302 includes a keeper 306 for engaging a catch 308, in the form of a leaf spring. The keeper 306—when released—is urged toward the open position by the leaf spring 308, which also serves as a catch, as described below. The keeper 306 uses a step-like feature 310 to keep it engaged when the fuel tank is not being accessed. However, instead of a conventional actuated pin, the keeper 306 is restrained by the multi-function leaf spring 308.

The catch 308 is biased in a direction away from engagement with the keeper 306. Thus, when the SMA actuator 110 rotates the pawl 312 out of engagement with the catch 308 (see FIG. 15), the latter—under its own bias—snaps in an outward direction, and the keeper 306 is released and moves slightly while urged upward by a lower portion 314 of the multi-function leaf spring 308. A shoe-like extending portion 318 is located near the end of the keeper 306, and retaining tabs 320 are built into the upper part of the leaf spring 308. The interaction between the rear of the shoe-like portion 318 and the tabs 320 causes the rising keeper 306 (lifted either by a user or by another spring bias not shown in these figures) to recharge and return the leaf spring upper portion 316 to the initial position (see FIGS. 15 and 16). The actuated pawl 312—in turn—is then free to return to its initial position under its own biased spring 322.

When the user returns the flap 302 to its closed position, the catch 308 has already been secured by the pawl 312. The upper portion 316 of the multi-function leaf spring 308 is deflected by the advancing "shoe" 318 portion of the keeper (see FIG. 17), until it snaps back behind the step-like projection 310 of the keeper 306 to bring it back into a latched condition (as in FIG. 15).

The use of a leaf spring 308 might be taken to imply a relatively weak mechanism, subject to being defeated by intruders. To prevent such access, stiff side arms 324 (see FIG. 18) are located in close proximity to solid shoulder-like projections built into the flap housing (not-shown). In the event of attempted intrusion, the intruder would try to lift the flap 302 mechanically. The stiff side arms 324 would then come into contact with the nearby shoulders which would prevent any further movement, since the leaf spring 308 would not yet have moved from the position shown in FIG. 14 to the position shown in FIG. 16. In normal operation, the clearance between the side arms 334 and the shoulders would be sufficient to prevent any additional friction. It should be understood that spring portions 314 and 316 may either comprise a unitary part or two separate parts.

Activating a flap latch mechanism using minimal actuator stroke and force but using the manual reset action available when the user opens the flap manually can therefore be beneficial. Also, use of a multi-function leaf spring can keep the cost low. In case of attempted burglary, the keeper hook 310 forces side arms 324 upwards. The side arms 324 then deflect slightly upward until they contact fixed retaining features, built into the fuel flap enclosure. Use of short and stubby side-arms 324 can withstand high shearing forces. The bottom and upper leaf springs 314 and 316 are kept relatively weak to allow leaf (not shown, for moving flap 302 relative to body 304) to overcome frictional forces.

A common and critical feature of both embodiments discussed above is the fact that the stroke and the force of the SMA actuator 100 has been decoupled from the force and stroke required to release the latch. Such a feature is absent from conventional trunk and tank latches. This brings about a number of benefits such as:
  The size, cost, weight, speed and power consumption of the actuator are all reduced.
  Variations in the load presented to the catch are not reflected in the load seen by the actuator.
  A more consistent load on the actuator increases its reliability and cyclic endurance.

Although the various embodiments of the present invention have been presented in terms of trunk latches and fuel filler flap latches, the principles outlined above are clearly of wider applicability as may be readily discerned by the skilled practitioner of the art. Accordingly the present invention should not be construed as limited by the embodiments shown. The disclosed SMA actuator 100 may be used with other mechanisms, and the disclosed mechanisms 200 and 300 may be carried out with actuators other than the disclosed SMA actuator 100, or with actuators other than SMA actuators in general.

The invention claimed is:

1. An SMA actuator, operated by an enemy source, the SMA actuator comprising:
  an SMA element having a first end, a second end, and a central portion therebetween, the SMA element being oriented so that the first and second ends are adjacent one another and attached to one of an anchor interface or payload interface, and so that the central portion of the SMA element is attached to the other of the anchor interface or the payload interface; and
  an electrical shorting device electrically connecting the first and second ends, whereby when an electrical potential is provided by the energy source to the SMA element between a first point located between the first end and the central portion and a second point located between the second end and the central portion, the electrical potential will be distributed substantially equally between the first and second points causing the SMA element to activate reducing the length of the SMA element.

2. The SMA actuator of claim 1, wherein the payload interface is a portion of one of a trunk latch or a fuel tank latch.

3. The SMA actuator of claim 1, wherein the electrical potential is provided via wires each having a terminal attached thereto, each terminal being attachable to the SMA element.

4. The SMA actuator of claim 1, wherein the first point and the second point are each generally half-way between the payload interface and the anchor interface.

5. The SMA actuator of claim 1, wherein the payload interface is a portion of a latch.

6. The SMA actuator of claim 5, wherein the latch is configured so that activation of the SMA element moves the portion of the latch so that the latch is openable by a user.

7. The SMA actuator of claim 6, wherein the latch is configured so that upon reclosing of the latch the SMA element is not damaged by movement of the portion of the latch.

8. An SMA actuator latch operated by an energy source, the SMA actuator latch comprising:
   a movable catch attached to a closeable element;
   a keeper movable between positions engaged with the catch or separated from the catch;
   a pawl movable between a first position holding the keeper in the engaged position or a second position allowing the keeper to move;
   an SMA actuator for moving the pawl from the first position to the second position, the SMA actuator including an SMA element having a first end, a second end, and a central portion therebetween, the SMA element being oriented so that the first and second ends are adjacent one another and attached to one of an anchor interface or a portion of the latch, and so that the central portion of the SMA element is attached to the other of the anchor interface or the portion of the latch; and
   an electrical shorting device electrically connecting the first and second ends, whereby, when an electrical potential is provided to the SMA element by the energy source between a first point located between the first end and the central portion and a second point located between the second end and the central portion, the electrical potential will be distributed substantially equally between the first and second points causing the SMA element to activate reducing the length of the SMA element and moving the portion of the latch, to thereby move the pawl from the first position to the second position.

9. The SMA actuator latch of claim 8, wherein the SMA actuator is connected to the pawl.

10. The SMA actuator latch of claim 8, further including a hook member for selectively retaining the pawl in the first position, the SMA actuator being connected to the hook member.

11. The SMA actuator latch of claim 8, wherein the latch is one of a trunk latch or a fuel tank latch.

12. The SMA actuator latch of claim 8, wherein the catch is one of a rotatable member or a leaf spring.

13. The SMA actuator latch of claim 8, wherein the pawl is spring biased.

14. The SMA actuator latch of claim 8, wherein the catch is spring biased.

15. The SMA actuator latch of claim 8, wherein the keeper resets the catch upon re-closing of the latch.

16. The SMA actuator latch of claim 8, wherein the electrical potential is provided via wires each having a terminal attached thereto, each terminal being attached to the SMA element.

17. The SMA actuator latch of claim 8, wherein the first point and the second point are generally half-way between the payload interface and the portion of the latch.

* * * * *

UNITED STATES PATENT AND TRADEMARK OFFICE
CERTIFICATE OF CORRECTION

| | | |
|---|---|---|
| PATENT NO. | : 8,393,652 B2 | Page 1 of 1 |
| APPLICATION NO. | : 11/719110 | |
| DATED | : March 12, 2013 | |
| INVENTOR(S) | : Szilagyi | |

It is certified that error appears in the above-identified patent and that said Letters Patent is hereby corrected as shown below:

In the Claim

Column 8, Line 44, Claim 1, "An SMA actuator, operated by an enemy source, the SMA..."; should read --An SMA actuator, operated by an energy source, the SMA...--

Signed and Sealed this
Twenty-third Day of September, 2014

Michelle K. Lee
*Deputy Director of the United States Patent and Trademark Office*